Figure 1:
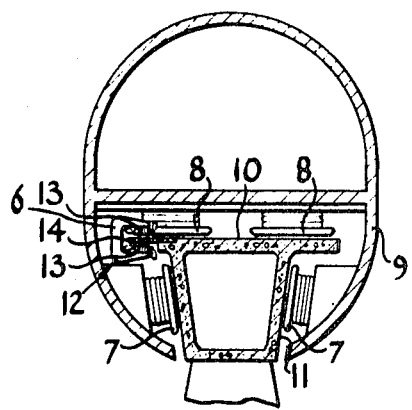

United States Patent

[11] 3,626,858

| [72] | Inventors | Norman Whitfield Colling;<br>George Philip Quayle, both of Fulwood, England |
|---|---|---|
| [21] | Appl. No. | 840,695 |
| [22] | Filed | July 10, 1969 |
| [45] | Patented | Dec. 14, 1971 |
| [73] | Assignee | Tracked Hovercraft Limited<br>London, England |
| [32] | Priority | July 11, 1968 |
| [33] | | Great Britain |
| [31] | | 33,182/68 |

[54] LINEAR INDUCTION MOTOR STATOR ASSEMBLY
19 Claims, 3 Drawing Figs.

[52] U.S. Cl. .................................................. 104/148
[51] Int. Cl. .................................................. B61b 13/00
[50] Field of Search .......................................... 104/148
LM, 120, 23 FS; 310/12, 13, 191, 209; 318/22, 38, 135

[56] References Cited
UNITED STATES PATENTS

| 3,434,083 | 3/1969 | Lewis | 310/191 |
| 3,516,361 | 6/1970 | Hart | 104/23 FS |

*Primary Examiner*—Richard E. Aegerter
*Assistant Examiner*—I. Kenneth Silverman
*Attorney*—Cameron, Kerkam & Sutton ABSTRACT: To control the thrust and hence the acceleration produced by a linear induction motor, an actuator is provided to vary the gap between the stator and the cooperating linear induction motor reaction rail. A tracked air cushion vehicle is shown propelled by a double sided linear motor. In one arrangement the stator has two parts which are disposed one on either side of the reaction rail, the stator parts are pivoted and a hydraulic actuator can pivot them apart. In another arrangement where the stator has two parts, the stator parts remain parallel to each other as the actuator moves them apart.

Patented Dec. 14, 1971　　　　　　　　3,626,858

LINEAR INDUCTION MOTOR STATOR ASSEMBLY

This invention relates to linear induction motors of the kind comprising a stator carrying a winding in the form of a row of coils which are fed with alternating current to produce a magnetic field which travels along the stator, and a rotor in the form of a fixed reaction rail comprising an elongate conducting member along which the stator is movable.

An object of this invention is to provide a means of controlling the thrust of such a motor.

According to the invention a linear induction motor stator assembly having at least one stator part includes an actuator for applying a force to the stator part to vary the gap between the stator part and the reaction rail with which the stator part cooperates in use. This enables the thrust and hence the acceleration provided by the motor to be controlled.

Alteration of the gap can be effected while maintaining the stator in generally parallel opposed relationship to the reaction rail or by pivotally swinging the stator towards and away from the reaction rail.

In addition to varying the gap, the stator may also be moved parallel to the reaction rail but in a direction at right angles to the longitudinal axis of the reaction rail so that, in effect, the stator is withdrawn from the reaction rail. This also results in a change in thrust. The invention, although not so restricted, has particular application to the propulsion of a tracked guided air cushion vehicle along its prepared track.

The invention may be used in combination with other methods of varying the thrust of a linear induction motor, such as frequency changing or pole switching. Where pole switching is used, a variation of thrust provided in accordance with the invention can be used to smooth out the sudden change in speed that would otherwise result from a change in pole pitch.

Figure 2:
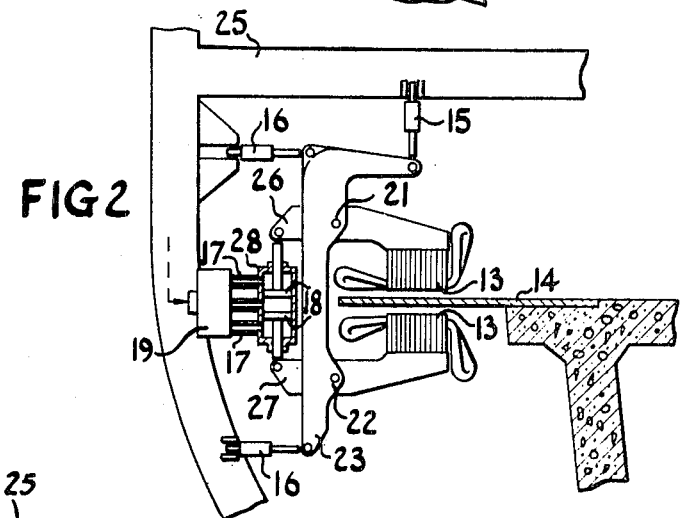
Figure 3:
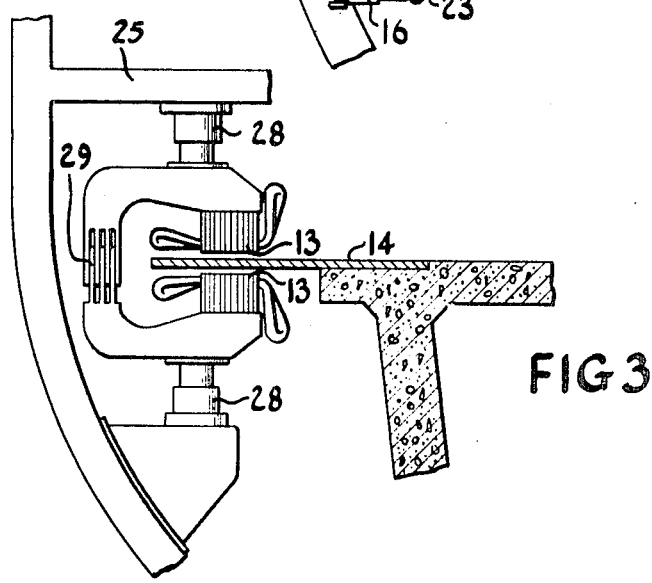

In the accompanying drawings:

FIG. 1 is a section through a tracked air cushion vehicle mounted on a prepared track and having a known linear induction motor stator assembly for propelling it along the track by cooperation with a linear induction motor reaction rail mounted on the track;

FIG. 2 is an enlarged section showing one way in which the assembly of FIG. 1 may be modified in accordance with the present invention; and FIG. 3 shows a further way in which the stator assembly of FIG. 1 may be modified in accordance with the invention. The track guided air cushion vehicle shown in FIG. 1 has a body 9 and is supported on a track 10 by air cushion devices 8. The vehicle is also guided laterally from the substantially vertical surfaces 11 of the track by means of air cushion devices 7, as is more fully described in U.S. Pat. No. 3,174,440 and 3,356,041. The vehicle is driven by a linear induction motor 12 which includes a known stator assembly having a pair of stator parts 13 rigidly interconnected by a yoke 6 and mounted on the vehicle so as to be disposed on opposite sides of an elongated linear induction motor reaction rail 14 in spaced relation thereto. The reaction rail 14 is formed of manganese steel and, as will be seen from the drawing, extends along the track in the manner of a fin.

In accordance with the present invention the thrust produced by the motor is controlled by moving the stator parts 13 away from each other to vary the gap between them and hence the individual gaps between the stator parts 13 and the reaction rail 14. One way of achieving this is shown in FIG. 2 where the stator parts 13 are mounted on arms 26 and 27 which extend transversely of the vehicle from the stator parts to beyond the free edge of the reaction rail 14. The arms 26 and 27 are respectively pivoted at 21 and 22 intermediate their ends on a further part 23 of the stator assembly, the part 23 being movably connected to the vehicle body 25 through servo-actuators 15 and 16. At their ends remote from the stator parts 13, the arms 26 and 27 are interconnected by a double-acting hydraulic actuator 28 having two opposed pistons 18 pivotally attached at their ends to the arms 26 and 27. It will therefore be appreciated that the hydraulic actuator 28 is arranged so that it can swing the two stator parts 13 about their pivots 21 and 22 so that the stator parts 13 will move simultaneously towards or away from the reaction rail 14.

To move the stator parts 13 apart (for example) hydraulic fluid is supplied to two hydraulic leads 17 so as to move the pistons 18 together. The separation of the stator parts reduces the thrust developed by the motor and hence the acceleration of the vehicle.

By starting the vehicle with the stator parts 13 fully apart and then moving them together gradually the amount of available thrust will increase, thus producing smooth acceleration up to cruising speed. At cruising speed the stator parts will be maintained in the position shown in FIG. 2.

The supply of hydraulic fluid to the actuator 28 is controlled by a controller 19 which includes a variable restriction in a hydraulic lead for so controlling the rate of movement of the pistons 18 that any variation of thrust is acceptable to passengers in the vehicle.

In addition to the variation in linear induction motor thrust provided by the actuator 28, further variation may be provided by the actuators 16 which are controllable to move the stator parts laterally of the reaction rail 14 so that, in effect, the stator may be withdrawn from the reaction rail.

FIG. 3 shown an alternative arrangement in which the stator parts 13 are moved towards or away from each other so as to alter their spacing from the reaction rail 14 my means of actuators 28 which individually connect the stator parts 13 to the vehicle body 25 in such a way that the stator parts remain in generally parallel opposed relation to the reaction rail 14 (and to each other), although their distance from the reaction rail varies. The stator parts are interconnected beyond the free edge of the reaction rail by a yoke 29 formed of two parts capable of relative movement towards and away from one another.

We claim:

1. A linear induction motor stator assembly for providing a propulsive thrust to propel a tracked air cushion vehicle along a predetermined path along which the said vehicle is constrained to travel, by electromagnetic cooperation with an elongate linear induction motor reaction rail extending along the predetermined path, the stator assembly having at least one stator part spaced from and adapted to cooperate with the elongate reaction rail, the stator assembly being movable relative to the rail along the length thereof, in which the improvement comprises means for varying the propulsive thrust produced by the stator including actuator means operable while the stator assembly is moving along the rail for applying a force to the stator part to vary the gap between the stator part and the rail.

2. A stator assembly as claimed in claim 1 arranged so that the stator part is maintained parallel to the rail while the gap is being varied by the actuator means.

3. A stator assembly as claimed in claim 1 in which the stator part is pivoted and swings towards or away from the rail to vary the gap.

4. A stator assembly as claimed in claim 1 in which the actuator means is hydraulically operated.

5. A linear induction motor stator assembly having two stator parts disposed in use on opposite sides of and spaced from an elongate reaction rail, the stator assembly being movable relative to the rail along the length thereof, in which the improvement comprises actuator means operable while the stator assembly is moving along the rail for applying a force to move the stator parts away from each other to vary the gap between each stator part and the rail.

6. A stator assembly as claim in claim 5 arranged so that the stator parts are maintained parallel to one another while the stator parts are being moved apart by the actuator means.

7. A stator assembly as claimed in claim 5 in which the stator parts are pivoted and swing towards or away from each other to vary the gap.

8. A stator assembly as claimed in claim 5 in which the actuator means is hydraulically operated.

9. A stator assembly as claimed in claim 1 connected to a track guided vehicle for propelling the vehicle.

10. A linear induction motor stator assembly for providing a propulsive thrust to propel a tracked air cushion vehicle along a predetermined path along which the said vehicle is constrained to travel, by electromagnetic cooperation with an elongate linear induction motor reaction rail extending along the predetermined path, the stator assembly comprising a body connected to the said vehicle, a linear induction motor stator having a winding energizable to produce the propulsive thrust, interconnection means movably interconnecting the body and the stator with the stator in spaced relation to the reaction rail, and means for varying the propulsive thrust produced by the stator including actuator means controllable to vary the spacing between the stator and the reaction rail during movement of the stator assembly along the predetermined path.

11. A stator assembly according to claim 10, wherein the interconnection means and the actuator means comprise at least one actuator in common.

12. A stator assembly according to claim 10, which includes further actuator means connecting the stator to the body and controllable to move the stator laterally of the reaction rail during movement of the stator assembly along the predetermined path whereby to further vary the propulsive thrust.

13. A linear induction motor stator assembly for providing a propulsive thrust for propelling a tracked air cushion vehicle along a predetermined path along which said vehicle is constrained to travel, by electromagnetic cooperation with an elongate linear induction motor reaction rail extending in the manner of a fin along the predetermined path, the stator assembly comprising a body connected to said vehicle, a linear induction motor stator formed with a winding energizable to produce the propulsive thrust and having two stator parts, interconnection means movably interconnecting the body and the stator with the stator parts disposed one on either side of the reaction rail in spaced relation thereto, and means for varying the propulsive thrust produced by the stator including actuator means controllable to vary the spacing between each stator part and the reaction rail during movement of the stator assembly along the predetermined path.

14. A stator assembly according to claim 13, which includes further actuator means connecting the stator to the body and controllable to move the stator laterally of the reaction rail during movement of the stator assembly along the predetermined path whereby to further vary the propulsive thrust.

15. A stator assembly according to claim 13, which includes a plurality of actuators individually connecting the stator parts to the body and controllable to vary the spacing of the stator parts from the reaction rail during movement of the stator assembly along the predetermined path whereby to vary the propulsive thrust, the interconnection means and the actuator means comprising the actuators in common.

16. A stator assembly according to claim 13, wherein the interconnection means comprises two arms each attached to a respective one of the stator parts and extending to beyond the free edge of the reaction rail, the actuator means comprising an actuator extending between the rms beyond the free edge of the reaction rail and controllable to vary the spacing between each stator part and the reaction rail by moving the arms relatively to one another.

17. A stator assembly according to claim 16, wherein the arms are each pivotally mounted between the respective stator part and the actuator.

18. A stator assembly according to claim 10 in combination with a tracked air cushion vehicle.

19. A stator assembly according to claim 13 in combination with a tracked air cushion vehicle.

* * * * *